W. A. DILLON.
SAFETY ENGINE CRANKING DEVICE.
APPLICATION FILED FEB. 11, 1916.
1,215,257.
Patented Feb. 6, 1917.
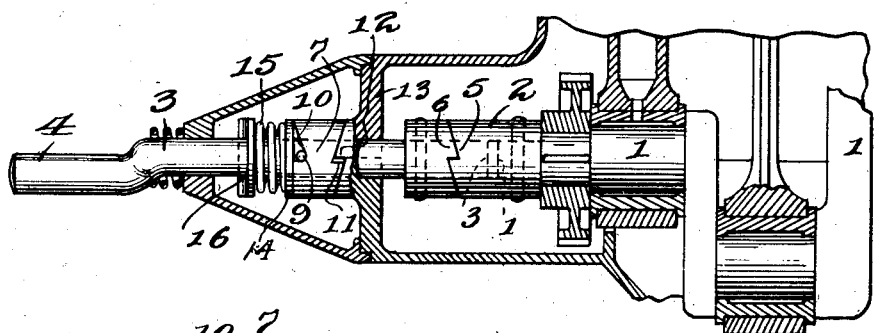
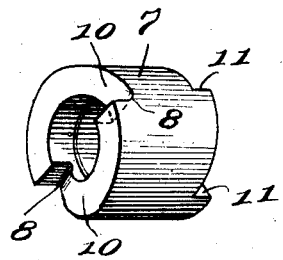
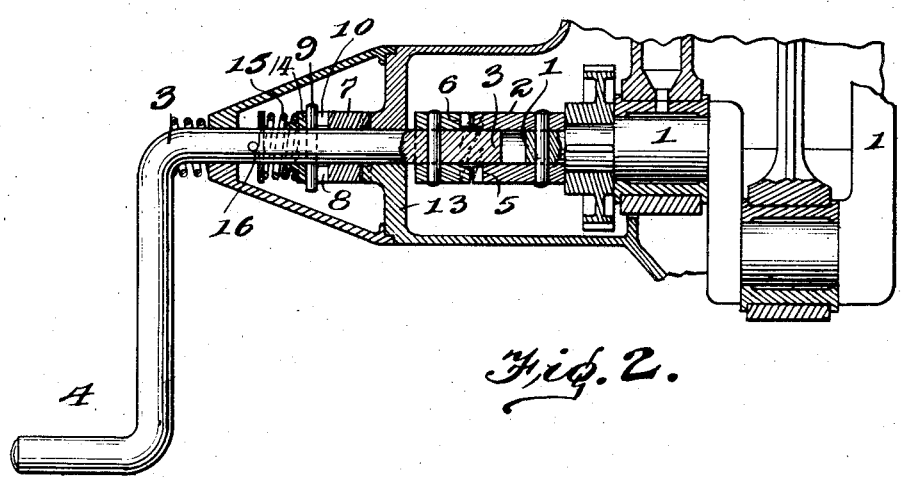
Inventor
William A. Dillon
By Victor J. Evans
Attorney
Witnesses

UNITED STATES PATENT OFFICE.

WILLIAM A. DILLON, OF MARLING, MISSOURI.

SAFETY ENGINE-CRANKING DEVICE.

1,215,257.  Specification of Letters Patent.  Patented Feb. 6, 1917.

Application filed February 11, 1916. Serial No. 77,671.

*To all whom it may concern:*

Be it known that I, WILLIAM A. DILLON, a citizen of the United States, residing at Marling, in the county of Montgomery and State of Missouri, have invented new and useful Improvements in Safety Engine-Cranking Devices, of which the following is a specification.

This invention relates to safety engine cranking devices, the object in view being to provide means whereby a person may safely crank or turn over the shaft of an internal combustion engine in order to start the latter, and at the same time guard against injury to the operator by providing means which will insure a disengagement between the cranking shaft and the engine shaft in case the latter starts to turn in the wrong direction, which frequently happens when the spark is too far advanced and the starting crank is moved too slowly.

With the above and other objects in view, the invention consists in the novel construction, combination and arrangement of parts, as herein described, illustrated and claimed.

In the accompanying drawings:—

Figure 1 is a side elevation of the cranking mechanism showing the parts in cranking position.

Fig. 2 is a longitudinal section through the same with the cranking shaft released.

Fig. 3 is a detail perspective view of the clutch sleeve.

Referring to the drawings 1 designates the shaft of an internal combustion engine. In the preferred embodiment of this invention, the forward end of the shaft 1 has fast thereon a tubular clutch member 2 in which is slidingly received, supported and guided the adjacent end portion of a cranking shaft 3 provided at its forward extremity with the usual hand crank 4.

The member 2 is provided at its forward extremity with a clutch face 5 which is adapted to be engaged by another tubular clutch member 6 bearing a fixed relation to the cranking shaft 3.

Mounted loosely on the cranking shaft and slidable to a limited extent longitudinally thereof is a thrust sleeve 7 having in the forward extremity thereof notches 8 which are adapted to be engaged by a pin 9 which is inserted through a hole extending diametrically of the cranking shaft 3. The forward end of the thrust sleeve is also formed with cam faces 10 which converge or slope toward each other and into the notches referred to, said cam faces being adapted to coöperate with the pin of the cranking shaft in a manner which will hereinafter appear.

At the opposite end the thrust sleeve is provided with a clutch face 11 which is adapted to engage a stationary clutch face 12 shown as supported by a stationary arm or bracket 13. A washer or collar 14 encircles the cranking shaft 3 in front of the pin above referred to, and is pressed against said pin and also against the forward extremity of the thrust sleeve by means of a coiled expansion spring 15 encircling the cranking shaft 3 and bearing against a spring seat 16 on said cranking shaft, shown in the form of a pin inserted through the shaft.

From the foregoing description, taken in connection with the accompanying drawings, the operation of the mechanism may now be explained as follows. In order to crank or start the engine, the operator grasps the hand crank and presses the same toward the engine so as to force the clutch face on the cranking shaft into positive engagement with the clutch face on the engine shaft. By now revolving the starting crank, the engine shaft is turned in a corresponding direction and the engine is started in the ordinary manner. In the event, however, of the engine starting to turn in the wrong direction, the clutch face of the thrust sleeve is held by the expansion spring referred to in engagement with the stationary clutch face and therefore the thrust sleeve is prevented from turning. A partial turning movement is, however, imparted to the crank shaft by reason of the engagement which is still maintained for a moment between the clutch faces of the cranking shaft and the engine shaft, but as the cranking shaft is thus turned, the pin carried thereby rides against the outwardly flaring cam faces of the thrust sleeve thereby causing a forward movement of the cranking shaft to an extent sufficient to disengage the clutch face of the cranking shaft from the clutch face of the engine shaft. This saves the hand or arm of the operator and renders the cranking mechanism perfectly safe in use even in the hands of a novice.

Having thus described my invention, I claim:—

In safety cranking mechanism for internal combustion engines, the combination with an engine shaft having a tubular clutch member fast thereon, of a longitudinally movable cranking shaft in alinement with the engine shaft, a tubular clutch member fast on said cranking shaft and movable into and out of engagement with the first named clutch member, a thrust sleeve normally loose on and slidable longitudinally of the cranking shaft and provided with diametrically opposite notches in its forward face and cam faces converging toward and leading to said notches, a pin inserted through the cranking shaft and adapted to be acted upon by said cam faces to move the cranking shaft away from the engine shaft, a clutch face on the opposite end of said sleeve, a stationary clutch coöperating with the last named clutch face to prevent rotation of said sleeve when the engine shaft turns in a reverse direction, a loose collar on the cranking shaft normally bearing against the forward face of said sleeve, and a spring bearing against said loose collar and coacting therewith to hold the clutch face of the sleeve in engagement with the stationary clutch face.

In testimony whereof I affix my signature in presence of two witnesses:

WILLIAM A. DILLON.

Witnesses:
GEO. V. RINKEL,
M. L. BELL, Jr.